US009116761B2

(12) United States Patent
Little et al.

(10) Patent No.: US 9,116,761 B2
(45) Date of Patent: Aug. 25, 2015

(54) SYSTEM AND METHOD FOR PREVENTING SINGLE-POINT BOTTLENECK IN A TRANSACTIONAL MIDDLEWARE MACHINE ENVIRONMENT (75) Inventors: Todd Little, Palatine, IL (US); Yongshun Jin, Beijing (CN); Erli Niu, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 109 days.

(21) Appl. No.: 13/415,670

(22) Filed: Mar. 8, 2012

(65) Prior Publication Data
US 2013/0086148 A1    Apr. 4, 2013

Related U.S. Application Data (60) Provisional application No. 61/541,054, filed on Sep. 29, 2011.

(51) Int. Cl.
G06F 11/20 (2006.01)
H04L 29/08 (2006.01)
G06F 9/54 (2006.01)

(52) U.S. Cl.
CPC ............... *G06F 9/544* (2013.01); *G06F 9/546* (2013.01); *G06F 11/2012* (2013.01); *G06F 2209/548* (2013.01); *H04L 67/1097* (2013.01)

(58) Field of Classification Search
None
See application file for complete search history.

(56) References Cited

U.S. PATENT DOCUMENTS 6,615,282 B1 * 9/2003 Futral .............................. 710/1
6,766,358 B1    7/2004 Chesson et al.
(Continued)

FOREIGN PATENT DOCUMENTS

FI    WO 99/57620    * 11/1999
WO       9957620       11/1999

OTHER PUBLICATIONS

Grun, Introduction to InfiniBand for End Users [online], 2010, InfiniBand Trade Association, retrieved on Nov. 21, 2012, http:/www.mellanox.com/pdf/whitepapers/Intro_to_IB_$_{1\ for}$_End_Users.pdf, 54 pages.

(Continued)

*Primary Examiner* — Ario Etienne
*Assistant Examiner* — Ho Shiu
(74) *Attorney, Agent, or Firm* — Tucker Ellis LLP (57) ABSTRACT A transactional middleware system can exchange messages between a local machine and a remote machine using Remote Direct Memory Access (RDMA) protocol to achieve short latency in a manner like a local message transfer. The transactional middleware machine environment can prevent single-point bottleneck and achieve short latency. The transactional middleware machine environment comprises a first message queue associated with a server in a first transactional machine, wherein the server operates to be accessed using a queue address in the first message queue. The transactional middleware machine environment further comprises a second message queue associated with a client in a second transactional machine. The client operates to send a service request message to the server directly using the first message queue, and the server operates to receive the service request message from the first message queue and send a service response message directly to the client using the second message queue.

17 Claims, 3 Drawing Sheets

(56) References Cited

U.S. PATENT DOCUMENTS

| | | |
|---|---|---|
| 6,938,138 B2 | 8/2005 | Beukema |
| 7,171,484 B1 | 1/2007 | Krause |
| 7,281,030 B1* | 10/2007 | Davis .......................... 709/212 |
| 7,574,536 B2 | 8/2009 | Johnsen |
| 7,620,693 B1* | 11/2009 | Mott et al. .................... 709/213 |
| 7,711,793 B1 | 5/2010 | Wilson |
| 7,849,228 B2 | 12/2010 | Boyd et al. |
| 7,944,920 B2 | 5/2011 | Pandya |
| 7,990,994 B1 | 8/2011 | Yeh et al. |
| 8,312,190 B2* | 11/2012 | Wang et al. .................... 710/62 |
| 2003/0061417 A1 | 3/2003 | Craddock |
| 2004/0015622 A1 | 1/2004 | Avery |
| 2005/0050549 A1 | 3/2005 | Joseph et al. |
| 2005/0220128 A1 | 10/2005 | Tucker et al. |
| 2005/0254493 A1 | 11/2005 | Chang et al. |
| 2007/0183418 A1 | 8/2007 | Riddoch et al. |
| 2007/0294426 A1* | 12/2007 | Huang et al. ................. 709/234 |
| 2008/0126509 A1 | 5/2008 | Subramanian et al. |
| 2008/0168471 A1* | 7/2008 | Benner et al. ................. 719/314 |
| 2008/0294712 A1 | 11/2008 | Lu et al. |
| 2009/0086748 A1* | 4/2009 | Wang et al. .................... 370/413 |
| 2010/0183024 A1 | 7/2010 | Gupta |
| 2010/0238796 A1* | 9/2010 | Supalov ......................... 370/225 |
| 2011/0078214 A1 | 3/2011 | Michaylov et al. |
| 2011/0142043 A1* | 6/2011 | Oved ............................ 370/390 |
| 2012/0216216 A1 | 8/2012 | Taboada |
| 2012/0221621 A1* | 8/2012 | Sugawara .................... 709/201 |

OTHER PUBLICATIONS

Forin et al., High-Performance Distributed Objects Over System Area Networks, Proceedings of the 3rd USENIX Windows NT Symposium, USENIX Assoc., Berkeley, CA, USA, pp. 21-30, 1999.

Ishizaki et al., CrispORB: High Performance CORBA for System Area Network, High Performance Distributed Computing, Proceedings of the Eighth International Symposium in Redondo Beach, CA, USA, IEEE Comput. Soc. US, Los Alamitos, CA, USA, pp. 11-18, Aug. 3-6, 1999.

International Search Report dated Feb. 7, 2013, in re International Application No. PCT/US2012/056945 filed Sep. 24, 2012.

International Searching Authority, International Search Report and Written Opinion for PCT International Patent Application No. PCT/US2012/057121, Dec. 11, 2012, 10 pages.

International Searching Authority, International Search Report and Written Opinion for PCT International Patent Application No. PCT/US2012/056950, Nov. 20, 2012, 10 pages.

International Searching Authority, International Search Report and Written Opinion for PCT International Patent Application No. PCT/US2012/056945, Feb. 7, 2013, 9 pages.

\* cited by examiner

SYSTEM AND METHOD FOR PREVENTING SINGLE-POINT BOTTLENECK IN A TRANSACTIONAL MIDDLEWARE MACHINE ENVIRONMENT

CLAIM OF PRIORITY

This application claims the benefit of priority on U.S. Provisional Patent Application No. 61/541,054, entitled "SYSTEM AND METHOD FOR PREVENTING SINGLE-POINT BOTTLENECK IN A TRANSACTIONAL MIDDLEWARE MACHINE ENVIRONMENT" filed Sep. 29, 2011, which application is herein incorporated by reference.

CROSS-REFERENCED APPLICATIONS

The current application hereby incorporates by reference the material in the following patent applications:

U.S. patent application Ser. No. 13/415,700, entitled "SYSTEM AND METHOD FOR SUPPORTING DIFFERENT MESSAGE QUEUES IN A TRANSACTIONAL MIDDLEWARE MACHINE ENVIRONMENT," filed Mar. 8, 2012; and U.S. patent application Ser. No. 13/415,712, entitled "SYSTEM AND METHOD FOR SUPPORTING A COMPLEX MESSAGE HEADER IN A TRANSACTIONAL MIDDLEWARE MACHINE ENVIRONMENT," filed Mar. 8, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to supporting a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a system and method for supporting exchanging messages between a local machine and a remote machine in a transactional middleware machine environment using Remote Direct Memory Access (RDMA) protocol. The transactional middleware machine environment can prevent single-point bottleneck and achieve short latency in a manner like a local message transfer. The transactional middleware machine environment comprises a first message queue and a second message queue. The first message queue is associates with a server in a first transactional machine, which can be accessed using a queue address in the first message queue. The second message queue is associated with a client in a second transactional machine. The client can send a service request message to the server directly using the first message queue, and the server can receive the service request message from the first message queue and send a service response message directly to the client using the second message queue.

DETAILED DESCRIPTION

Described herein is a system and method for supporting a transactional middleware system, such as Tuxedo, that can take advantage of fast machines with multiple processors, and a high performance network connection. A transactional middleware system can exchange messages between a local machine and a remote machine using Remote Direct Memory Access (RDMA) protocol to achieve short latency in a manner like a local message transfer. The transactional middleware machine environment comprises a first message queue associate with a server in a first transactional machine, wherein the server operates to be accessed using a queue address in the first message queue. The transactional middleware machine environment further comprises a second message queue associated with a client in a second transactional machine. The client operates to send a service request message to the server directly using the first message queue, and the server operates to receive the service request message from the first message queue and send a service response message directly to the client using the second message queue.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

In accordance with an embodiment of the invention, a transactional middleware system can exchange messages between a local machine and a remote machine using Remote Direct Memory Access (RDMA) protocol to achieve short latency in a manner like a local message transfer.

Providing Direct Message Transfer

In accordance with an embodiment of the invention, a middleware machine environment, such as the Exalogic middleware machine environment, can be a tightly coupled and logically uniform environment for a transactional application, such as a Tuxedo application. There is no single-point bottleneck in transferring messages between machines in the transactional middleware machine environment.

Figure 1:
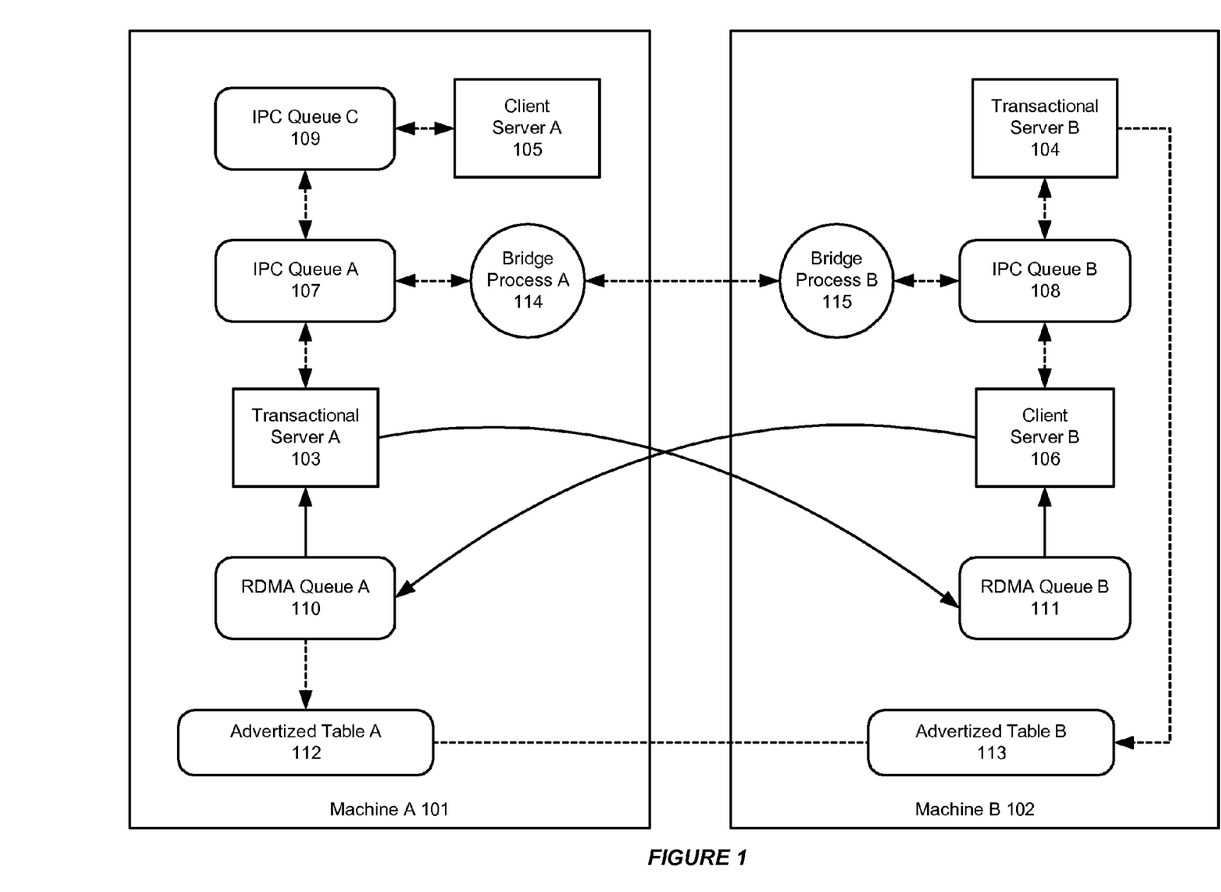
FIG. 1 shows an illustration of a transactional middleware machine environment that can provide direct message transfer, in accordance with an embodiment of the invention.

FIG. 1 shows an illustration of a transactional middleware machine environment that can provide direct message transfer, in accordance with an embodiment of the invention. As shown in FIG. 1, the transactional middleware machine environment includes a plurality of transactional middleware machines: Machine A 101 and Machine B 102. Each transactional middleware machine includes an advertized table 112 or 113, for example a Bulletin Board (BB) in Tuxedo. The advertized table can be shared by different machines.

As shown in FIG. 1, Client B on machine B can look up the advertized table for a server that provides a service that Client B needs. This target server can be either a local server such as Server B on Machine B, or a remote server such as Server A on Machine A.

If the service is on a local server, Client B can send a service request message to the target server and receive a service response message, via one or more System V Inter-process Communication (IPC) queues, such as an IPC queue B 108 on Machine B.

On the other hand, if the service is on a remote server such as Server A on Machine A, the Client B can use a RDMA messaging queues to exchange message directly even though they are physically distributed among multiple machines. A RDMA queue is a library which can send and receive messages that is base on the RDMA protocol running on a high performance network such as an IB network.

As shown in FIG. 1, Client B can put a service request message directly into a RDMA queue A 110 on Machine A associated with the server A. Sever A can get the service request message from the RDMA queue A and processes the service request. Then, Server A can put a service response message directly into a RDMA queue B 111 on Machine B associated with the Client B, so that Client B can get the service response.

Alternatively, as shown in FIG. 1, there can be a Bridge process A 114 on Machine A and a Bridge process B 115 on Machine B. Using these Bridge processes, when Client B on Machine B targets a message to a remote Machine A, Client B can first send the service request message to the System V IPC queue B 108, which is associated with the local bridge process, Bridge process B 115. Then, the Bridge process B 115 can forward this message to another the bridge process, Bridge process A 114 on the remote target Machine A, via network. Finally, the Bridge process A at the remote target Machine A can send the message to the System V IPC queue A that is associated with the target Server A. However, this procedure can be time-consuming, and can introduce a relatively long latency. Also, each of the bridge process can be too busy under heavy load and become a single point bottleneck that can impact the throughput of the system as a whole.

As shown in FIG. 1, server A 103 can listen to both a System V IPC queue A 107 and a RDMA queue A 110 at the same time in different threads. A message sender, such as Client B, can choose a faster way to send the message to server A. In general, the RDMA queue can be used for remote message transferring, and the System V IPC queue can be used for local message transferring since the RDMA queue may be slower than System V IPC queue for local message transferring.

Figure 2:
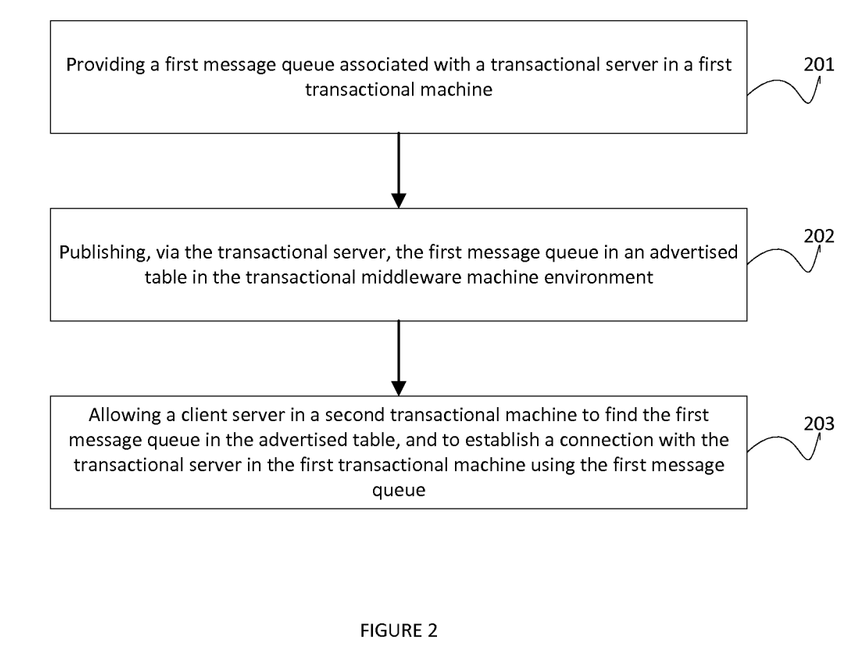
FIG. 2 illustrates an exemplary flow chart for providing direct message transfer in a transactional middleware machine environment, in accordance with an embodiment of the invention.

FIG. 2 illustrates an exemplary flow chart for providing direct message transfer in a transactional middleware machine environment, in accordance with an embodiment of the invention. As shown in FIG. 2, at step 201, a first message queue is provided to be associated with a transactional server in a first transactional machine. Then, at step 202, the transactional server can publish the first message queue in an advertized table in the transactional middleware machine environment. Finally, at step 203, a client server in a second transactional machine can find the first message queue in the advertized table, and establish a connection with the transactional server in the first transactional machine using the first message queue.

Bypassing the BRIDGE Process in Tuxedo using the RDMA Protocol

In accordance with an embodiment of the invention, a transactional middleware system can exchange messages between a local machine and a remote machine using a RDMA queue via the RDMA protocol, such as a MSGQ queue library in Tuxedo. The RDMA protocol can be used for transferring data across machines running on a high performance IB network. Using the RDMA protocol, the message sender and receiver can exchange message directly even when they are physically distributed among multiple machines.

Tuxedo is a transactional middleware with class distributed client-server structure. Each Tuxedo server can publish its MSGQ queue name in a table advertized throughout the domain. A client server can find the queue name of a target server in the advertized table and establish a connection with the target server if it is the first time for the connection. Then, the client server and the target server can establish a connection according to this queue name, and send a message via the established connection.

Additionally, Tuxedo can use a BRIDGE process in each machine within a domain, to exchange messages across machines. Using a BRIDGE process, every message targeting a remote machine can be first sent to a System V IPC queue associated with a local BRIDGE process. Then, the local BRIDGE process can forward this message to a remote BRIDGE process at remote target machine via the network. Finally, the remote BRIDGE process at the remote target machine can send the message to the target System V IPC queue.

In accordance with an embodiment of the invention, a RDMA queue library can be implemented with minimum code change, using a series of message transfer APIs that are implemented using a System V style. These message transfer APIs can provide similar functions that the System V IPC queue provides, for example receiving messages from a queue with priority.

Figure 3:
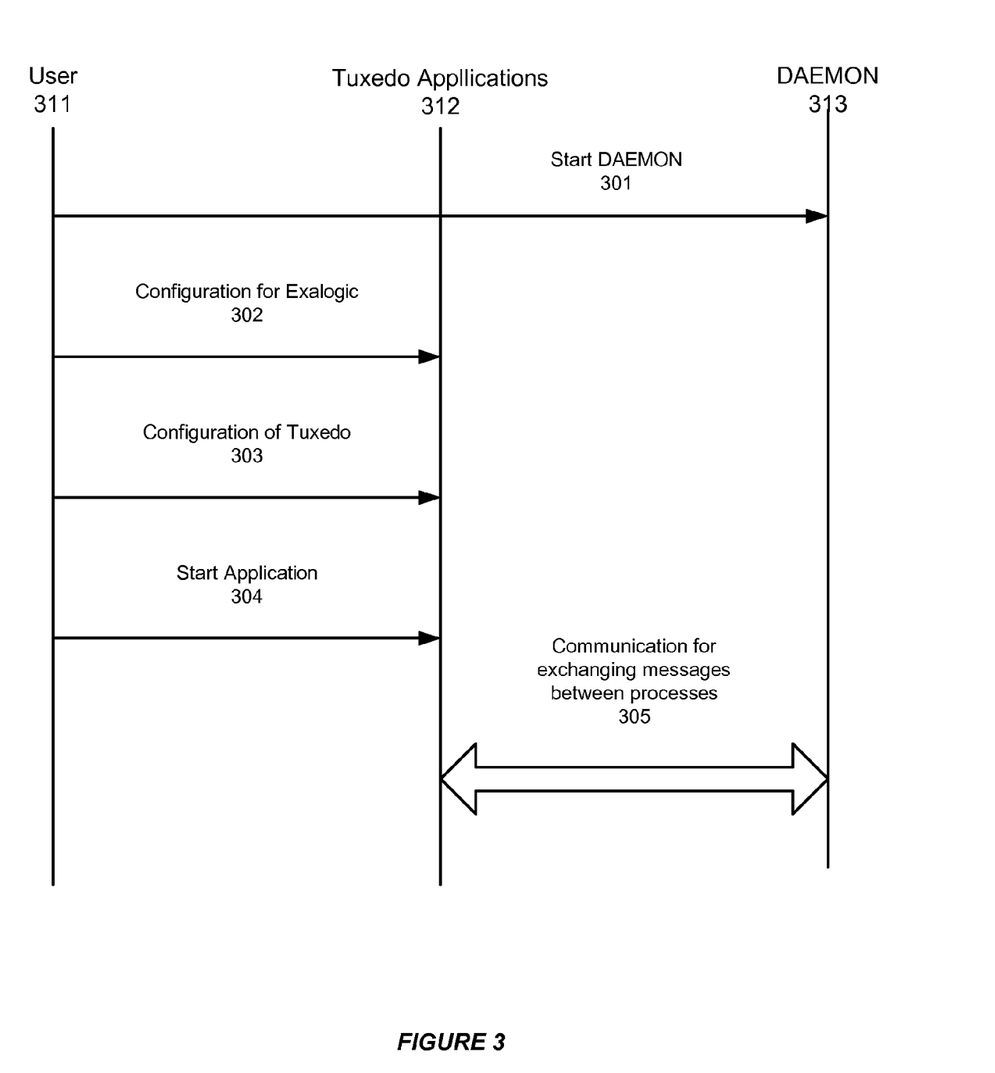
FIG. 3 shows an illustration of setting up a bypass bridge process feature in a transactional middleware machine environment, in accordance with an embodiment of the invention.

FIG. 3 shows an illustration of setting up a bypass bridge process feature in a transactional middleware machine environment, in accordance with an embodiment of the invention. As shown in FIG. 3, at step 301, a user 311 can first start a DAEMON process. The DAEMON process 313 can be a separate application from the transactional application such as the Tuxedo application. Also, in the example of Tuxedo, at least one DAEMON process is started for each Tuxedo machine. Then, at steps 302 and 303, the user can configure the application server and the transactional application (Tuxedo) respectively. Finally, at step 304, the user can start the Tuxedo applications in order to use the bypass BRIDGE feature, and at step 305, the user allows the communication for exchanging messages between the processes.

The following Table 1 shows different options for executing a DAEMON program in Tuxedo.

TABLE 1

| Options | Description |
| --- | --- |
| -i | The Infiniband interface's IP address, the value of which is identical to RDMADAEMONIP. |
| -p | The port that daemon accept request from, the value of which is identical to RDMADAEMONPORT. |
| -m | The shared memory size allocated for daemon, the value of which is greater than the number of queues *(number of IPs connecting using remotename + 1) * qsize |
| -k | The shared memory key to be used by daemon. |

For example, a DAEMON program can be started using the following command:

Msgq_daemon -i 192.168.10.4 -p 4040 -m 100000000 -k 9100

Additionally, different kinds of parameters are configured for Tuxedo applications in order to utilize the message queue. These parameters include at least the parameters of the message queue and the parameters that the processes in the Tuxedo applications use to communicate with the DAEMON process. These parameters can be configured in MACHINES section of a configuration file, such as a Tuxedo UBB file. The following Table 2 shows these environmental variables.

TABLE 2

| UBB Parameters | Description |
| --- | --- |
| RDMADAEMONIP | The IP address for communicating with DAEMON. |
| RDMADAEMONPORT | The port for communicating with DAEMON. |
| RDMAQSIZE | The maximum size of the message queue, with a default value to be 1 Mbytes. This parameter can be configured in MACHINES section or SERVERS section (using server option "-b"). Its value in MACHINES section configures the default value for all queues. Its value in SERVERS section only configures the queue created by the server. |
| RDMAQENTRIES | The maximum entries of the message queue, with a default value to be 1024. This parameter can be configured in MACHINES section or SERVERS section (using server option "-c"). Its value in MACHINES section configures the default value for all queues. Its value in SERVERS section only configures the queue created by the server. |

The following Listing 1 includes a few sections of an exemplary Tuxedo configuration file.

Listing 1

```
*MACHINES
slcag1906
        LMID=cpu_0
        APPDIR="/root/john/mnt/eniu/exalogic/cases/config/testcase"
        TUXCONFIG="/root/john/mnt/eniu/exalogic/cases/config/testcase/tuxconfig"
        TUXDIR="/root/john/mnt/eniu/TUX11gR1PS164rp/LC/bld"
        UID=507
        GID=506
        RDMADAEMONIP="192.168.10.4"
        RDMADAEMONPORT=9800
        RDMAQSIZE=1048576
        RDMAQENTRIES=1024
*SERVERS
simpserv
        CLOPT="-A -b 1000000 -c 1000 -j 1000000"
        SRVGRP=GROUP1 SRVID=1
Simpserv1
        SRVGRP=GROUP1 SRVID=1
```

The following Listing 2 is an example of RESOURCES section in a Tuxedo configuration file.

Listing 2

```
*RESOURCES
IPCKEY      213456
#Example:
#IPCKEY     123456
DOMAINID    simpapp
MASTER      simple
MAXACCESSERS   10
MAXSERVERS  5
MAXSERVICES  10
MODEL       SHM
LDBAL       N
OPTIONS     NO_XA,EXALOGIC,RDMA
```

As shown in the above example, EXALOGIC and RDMA can be added into the item OPTIONS in the RESOURCES section of a Tuxedo configuration file. If OPTIONS contains both RDMA and EXALOGIC, the bypass feature is activated and the local bridge processes are bypassed. Otherwise, the bypass feature is turned off. If there is a need to enable the RDMA option, the EXALOGIC option is enabled first. After enable RDMA option in the RESOURCES section. Attribute "TYPE" of MACHINES section may not be set, since by default, any machines in MP mode is an Exalogic machine (with the same type) to support RDMA feature.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing direct message transfer in a transactional middleware machine environment, comprising:
   a first message queue and a second message queue operating according to different messaging protocols, each queue being associated with a transactional server in a first transactional machine, wherein the transactional server provides one or more transactional services;
   an advertized table in the transactional middleware machine environment, wherein the transactional server operates to publish said one or more transactional services and the first message queue and the second message queue associated with the transactional server in the advertized table;
   wherein the transactional server listens to both the first message queue and the second message queue; and
   wherein a client server in a second transactional machine operates to
      look up the advertized table for the transactional server that provides said one or more transactional service,
      find the first message queue and the second message queue associated with the transactional server in the advertized table,
      determine which of the first message queue and the second message queue is likely to have a higher expected rate of transfer, and
      establish a connection with the transactional server in the first transactional machine and directly exchange one or more messages using either the first message queue or the second message queue based on the determination.

2. The system of claim 1, wherein the client server operates to send a service request message to the transactional server directly using either the first message queue or the second message queue.

3. The system of claim 2, wherein the transactional server operates to receive the service request message from the first message queue, and send a service response message directly to the client server using the second message queue that is associated with the client server in the second transactional machine.

4. The system of claim 1, wherein there is no single-point bottleneck in transferring messages between machines in the transactional middleware machine environment.

5. The system of claim 1, wherein the first message queue uses a messaging protocol for transferring data across machines running on a high performance network.

6. The system of claim 5, wherein the messaging protocol is a remote direct memory access (RDMA) protocol for an Infiniband (IB) network.

7. The system of claim 1, wherein the transactional server uses the second message queue for communication with a local client in the first transactional machine.

8. The system of claim 7, wherein the second message queue is an inter-process communication (IPC) queue that is associated with a local bridge process.

9. A method for providing direct message transfer in a transactional middleware machine environment, comprising:
   providing a first message queue and a second message queue operating according to different messaging protocols, each queue being associated with a transactional server in a first transactional machine, wherein the transactional server provides one or more transactional service;
   publishing, via the transactional server, said one or more transactional services and the first message queue and the second message queue associated with the transactional server in an advertized table in the transactional middleware machine environment;
   listening, via the transactional server, to both the first message queue and the second message queue; and
   allowing a client server in a second transactional machine to
      look up the advertized table for the transactional server that provides said one or more transactional service,
      find the first message queue and the second message queue associated with the transactional server in the advertized table,
      determine which of the first message queue and the second message queue is likely to have a higher expected rate of transfer, and
      establish a connection with the transactional server in the first transactional machine and directly exchange one or more messages using either the first message queue or the second message queue based on the determination.

10. The method of claim 9, further comprising allowing the client server to send a service request message to the transactional server directly using either the first message queue or the second message queue.

11. The method of claim 10, further comprising receiving, via the transactional server, the service request message from the first message queue, and sending, via the transactional server, a service response message directly to the client server using the second message queue that is associated with the client server in the second transactional machine.

12. The method of claim 9, further comprising preventing single-point bottleneck in transferring messages between machines in the transactional middleware machine environment.

13. The method of claim 9, further comprising allowing the first message queue to use a messaging protocol for transferring data across machines running on a high performance network.

14. The method of claim 13, wherein the messaging protocol is a remote direct memory access (RDMA) protocol for an Infiniband (IB) network.

15. The method of claim 9, wherein the transactional server uses the second message queue for communication with a local client in the first transactional machine, wherein the second message queue is an inter-process communication (IPC) queue that is associated with a local bridge process.

16. The method of claim 15, further comprising listening, via the transactional server, to both the first message queue and the second message queue at same time in different threads, and choosing a faster route to send a message.

17. A non-transitory machine readable storage medium having instructions stored thereon that when executed cause a system to perform the steps comprising:

providing a first message queue a second message queue operating according to different messaging protocols, each queue being associated with a transactional server in a first transactional machine, wherein the transactional server provides one or more transactional service;

publishing, via the transactional server, said one or more transactional services and the first message queue and the second message queue associated with the transactional server in an advertized table in the transactional middleware machine environment;

listening, via the transactional server, to both the first message queue and the second message queue; and allowing a client server in a second transactional machine to look up the advertized table for the transactional server that provides said one or more transactional service, find the first message queue and the second message queue associated with the transactional server in the advertized table, determine which of the first message queue and the second message queue is likely to have a higher expected rate of transfer, and establish a connection with the transactional server in the first transactional machine and directly exchange one or more messages using either the first message queue or the second message queue based on the determination.

* * * * *

UNITED STATES PATENT AND TRADEMARK OFFICE
CERTIFICATE OF CORRECTION

| | | |
|---|---|---|
| PATENT NO. | : 9,116,761 B2 | Page 1 of 1 |
| APPLICATION NO. | : 13/415670 | |
| DATED | : August 25, 2015 | |
| INVENTOR(S) | : Little et al. | |

It is certified that error appears in the above-identified patent and that said Letters Patent is hereby corrected as shown below:

In the Drawings

On sheet 3 of 3, in FIG. 3, under Reference Numeral 312, line 1, delete "Appllications" and insert -- Applications --, therefor.

In the Claims

In column 9, line 24, in claim 17, after "queue" insert -- and --.

Signed and Sealed this
Thirty-first Day of May, 2016

Michelle K. Lee
*Director of the United States Patent and Trademark Office*